US 11,098,609 B2

(12) United States Patent
Gier

(10) Patent No.: US 11,098,609 B2
(45) Date of Patent: Aug. 24, 2021

(54) ROTOR BLADE SHROUD FOR A TURBOMACHINE, ROTOR BLADE, METHOD OF MAKING A ROTOR BLADE SHROUD AND A ROTOR BLADE

(71) Applicant: MTU Aero Engines AG, Munich (DE)

(72) Inventor: Jochen Gier, Karlsfeld (DE)

(73) Assignee: MTU Aero Engines AG, Munich (DE)

(*) Notice: Subject to any disclaimer, the term of this patent is extended or adjusted under 35 U.S.C. 154(b) by 114 days.

(21) Appl. No.: 16/253,497

(22) Filed: Jan. 22, 2019

(65) Prior Publication Data

US 2019/0226352 A1 Jul. 25, 2019

(30) Foreign Application Priority Data

Jan. 23, 2018 (DE) ...................... 10 2018 200 964.3

(51) Int. Cl.

| F01D 5/22 | (2006.01) |
| F01D 11/12 | (2006.01) |
| F01D 25/24 | (2006.01) |
| B33Y 10/00 | (2015.01) |
| B33Y 80/00 | (2015.01) |

(52) U.S. Cl.
CPC ............ F01D 11/122 (2013.01); F01D 5/225 (2013.01); F01D 25/24 (2013.01); *B33Y 10/00* (2014.12); *B33Y 80/00* (2014.12); *F05D 2240/14* (2013.01); *F05D 2240/307* (2013.01); *F05D 2240/55* (2013.01); *F05D 2250/283* (2013.01); *F05D 2300/522* (2013.01)

(58) Field of Classification Search
CPC ........ F01D 5/225; F01D 11/08; F01D 11/122; F01D 11/125
See application file for complete search history.

(56) References Cited

U.S. PATENT DOCUMENTS

| 3,844,011 A | * | 10/1974 | Davies | ................. B29C 43/006 428/547 |
| 2003/0228223 A1 | * | 12/2003 | Bunker | ................... F01D 5/225 416/97 R |
| 2013/0243600 A1 | * | 9/2013 | Noble | ...................... F01D 5/20 416/204 R |
| 2013/0280049 A1 | * | 10/2013 | Fisk | ...................... F01D 11/127 415/173.4 |

(Continued)

FOREIGN PATENT DOCUMENTS

| DE | 102009030566 A1 | 12/2010 |
| DE | 102016125091 A1 | 6/2017 |

(Continued)

*Primary Examiner* — Woody A Lee, Jr.
(74) *Attorney, Agent, or Firm* — Barlow Joseph and Holmes Ltd; Stephen Holmes

(57) ABSTRACT

The present invention relates to a rotor blade shroud for a turbomachine, comprising a sealing tip and a support structure that abuts the sealing tip. The support structure has at least one intermediate region in which a structural segment is arranged, wherein the radially outwardly arranged surface of the support structure and of the structural segment forms an essentially planar surface. The present invention further relates to a rotor blade for a turbomachine, comprising a rotor blade shroud as well as two methods of manufacturing a rotor blade shroud and a method of manufacturing a rotor blade.

14 Claims, 3 Drawing Sheets

(56) References Cited

U.S. PATENT DOCUMENTS

| | | | | |
|---|---|---|---|---|
| 2014/0178201 A1* | 6/2014 | Boeck | ................... | F01D 5/225 |
| | | | | 416/182 |
| 2014/0255194 A1* | 9/2014 | Jones | ................... | F01D 5/225 |
| | | | | 416/212 A |
| 2015/0275916 A1* | 10/2015 | Marshall | ................ | B33Y 80/00 |
| | | | | 415/148 |
| 2015/0354393 A1* | 12/2015 | Lipkin | ................. | F01D 11/122 |
| | | | | 427/448 |
| 2016/0341216 A1* | 11/2016 | Cortequisse | .......... | F04D 29/164 |
| 2017/0189966 A1* | 7/2017 | Giannozzi | ................. | B22F 3/15 |
| 2017/0370241 A1* | 12/2017 | Tham | ...................... | F01D 5/284 |
| 2019/0136700 A1* | 5/2019 | Martin, Jr. | ............. | F01D 5/225 |
| 2019/0275618 A1* | 9/2019 | Wassmer | ........... | B23K 26/0622 |
| 2019/0323364 A1* | 10/2019 | Sippel | ....................... | F01D 5/20 |
| 2020/0088044 A1* | 3/2020 | Stiehler | .................. | F01D 5/147 |

FOREIGN PATENT DOCUMENTS

| | | | |
|---|---|---|---|
| EP | 1413712 | A1 | 4/2004 |
| EP | 2955243 | A2 | 12/2015 |
| JP | H0828303 | A | 1/1996 |
| WO | 2017222518 | A1 | 12/2017 |

\* cited by examiner

ROTOR BLADE SHROUD FOR A
TURBOMACHINE, ROTOR BLADE,
METHOD OF MAKING A ROTOR BLADE
SHROUD AND A ROTOR BLADE

BACKGROUND OF THE INVENTION

The present invention relates to a rotor blade shroud for a turbomachine and further relates to a rotor blade, two methods of manufacturing a rotor blade shroud, and a method of manufacturing a rotor blade in accordance with the present invention.

Known from practice are rotor blades for turbomachines having shrouds with sealing tips. These shrouds are intended, among other things, to prevent the medium that flows through the turbomachine from passing between the shroud and the adjoining housing. Leakage flows of this kind can reduce the efficiency of the turbomachine, for example.

Shrouds of rotor blades of turbomachines may often have stiffening structures on account of high centrifugal loads at high rotational speeds. The construction design of these stiffening structures varies. For example, the sealing tips can be provided with stiffening structures. Examples of various stiffening structures with ribs and depressions are known from DE 10 2009 030566 A1.

Known from US 2003 0228223 A1 and JP H08 28 303 A are cooled blades that have cooling channels inside the shrouds. A cooling medium flows through the cooling channels, which are in fluidic connection with the outer blade surroundings as well as with the inner feed channels.

SUMMARY OF THE INVENTION

An object of the present invention is to propose another rotor blade shroud for a turbomachine. Another object of the present invention is to propose a rotor blade, two methods of manufacturing a rotor blade shroud, and a method of manufacturing a rotor blade.

The object in accordance with the invention is achieved by a rotor blade shroud of a turbomachine of the present invention. The object in accordance with the invention is further achieved by a rotor blade, by two methods of manufacturing a rotor blade shroud, and by a method of manufacturing a rotor blade with the features in accordance with the present invention.

Proposed in accordance with the invention is a rotor blade shroud for a turbomachine that comprises at least one sealing tip or else one or a plurality of sealing tips and a support structure abutting the sealing tip. The support structure has at least one intermediate region in which at least one structural segment is arranged. The radially outwardly arranged surface of the support structure and of the structural segment forms an essentially planar surface. The radial direction refers to the axis of rotation of the turbomachine.

The rotor blade according to the invention for a turbomachine comprises a rotor blade shroud that has at least one sealing tip and a support structure that abuts the sealing tip. The support structure has at least at least one intermediate region in which at least one structural segment is arranged. The radially outwardly arranged surface of the support structure and of the structural segment forms an essentially planar surface.

In some exemplary embodiments in accordance with the invention, the rotor blade according to the invention is manufactured generatively or additively. A generatively manufactured rotor blade may be referred to as a one-piece rotor blade.

A generative manufacturing method may be referred to as an additive manufacturing method, fabrication method, or as rapid prototyping. A generative manufacturing method is, for example, the selective laser sintering (SLS) method, the selective laser melting (SLM) method, or the cold gas spraying method.

A first method according to the invention for manufacturing a rotor blade shroud for a turbomachine comprises, as a first step, the provision of a rotor blade shroud that has at least one sealing tip and a support structure abutting the sealing tip. The support structure has at least one intermediate region. In a second step of the method, at least one structural segment is produced. The structural segment is produced, in particular, by an additive manufacturing step. In a third step of the method, the at least one structural segment is inserted into the intermediate region of the support structure, so that a radially outwardly arranged surface of the support structure and of the structural segment forms an essentially planar surface.

A second method according to the invention for manufacturing a rotor blade shroud for a turbomachine comprises only one method step, in which the rotor blade shroud is produced by means of an additive manufacturing method. In this one-step method step, the rotor blade shroud comprises both the production of the support structure that has the at least one sealing tip and the production of the structural segment that is arranged in the intermediate region. Different materials can be utilized; for example, a first material can be utilized for the rotor blade shroud and a second material can be utilized for the rotor blade.

Another method of manufacturing a rotor blade for a turbomachine comprises a fabrication step that is executed by means of an additive manufacturing method. The rotor blade comprises a rotor blade shroud according to the invention for a turbomachine, said rotor blade shroud having at least one sealing tip and a support structure that abuts the sealing tip. The support structure has at least one intermediate region in which at least one structural segment is arranged. The radially outwardly arranged surface of the support structure and of the structural segment forms an essentially planar surface.

Advantageous enhancements of the present invention are each the subject of dependent claims and embodiments the present invention as discussed in detail below.

Exemplary embodiments in accordance with the invention may have one or a plurality of the features mentioned in the following.

The rotor blade shroud according to the invention can be a rotor blade shroud segment or may be referred to as such. A rotor blade shroud segment can be a segment of a rotor blade shroud that is provided for a single rotor blade. A plurality of rotor blades can be joined together over a periphery to form a rotor. When a plurality of rotor blades having rotor blade shroud segments are joined together to form a rotor having a shroud, this can lead to a closed shroud over the entire periphery of the rotor.

A rotor can comprise one rotor stage or may be referred to as a rotor stage. A rotor may be referred to as a rotating wheel.

For simplicity in the following, the term rotor blade shroud will be used synonymously to the term shroud. A shroud can be a shroud segment, in particular a shroud segment for a rotor blade.

In some exemplary embodiments in accordance with the invention, the shroud according to the invention is prepared and configured for a gas turbine. In some exemplary embodiments in accordance with the invention, the shroud according to the invention is prepared and configured for a steam turbine.

A gas turbine can be an aircraft engine. An aircraft engine may be referred to as a jet engine.

A sealing tip of a shroud may be referred to as a sealing fin. Sealing tips can brush against or run in against honeycomb-shaped seals in a housing of the turbomachine. The seals may be referred to as abradable seals, abradable coatings, run-in coatings, or run-in seals. The sealing tips can be web-shaped in form.

In some exemplary embodiments in accordance with the invention, the support structure abutting the sealing tip is connected to the sealing tip. The sealing tip and the support structure can be produced in one piece in one fabrication step, for example, by means of a primary forming method and/or by means of a shaping method (metal casting method, forging method, etc.). A structural component that is produced in one piece and has a sealing tip and a support structure can be post-processed by means of various processing methods. For example, drillings for holes and recesses, final dimension machining, etc. can occur by means of material-removal methods on the structural component. It is equally possible for the entire structural component or for individual sections of the structural component to be hardened. Furthermore, coatings can be applied on the entire structural component, for example, or else on individual sections. The coatings may differ depending on the section of the structural component. For example, the region of the sealing tip that is intended to engage in a run-in seal at the housing during use can be coated. Alternatively, the sealing tip and the support structure can be produced in two parts or in multiple parts. In the case of multiple-part production of, the individual parts can be joined to one another, in particular, by means of a joining method, such as, for example, by means of welding or soldering. The connected parts can undergo final processing, for example, by means of hardening, grinding, etc.

In some exemplary embodiments in accordance with the invention, the support structure abutting the sealing tip is a solid region that is arranged outside of the sealing tip. A solid region is, in particular, a region without any hollow structures or cavities inside of the solid region. The support structure can be provided and configured for stiffening of the rotor blade shroud. A support structure can be lattice-like, honeycomb-like, regular, or irregular in form. The support structure may have differing wall thicknesses and/or differing recesses or holes.

A support structure may be referred to as a structural section.

In some exemplary embodiments in accordance with the invention, the support structure has at least one intermediate region in which at least one structural segment is arranged, whereby the structural segment abuts the support structures or is connected to the support structures. The structural segment can be fixed in place in the intermediate region, for example, in a friction-fitting manner and/or form-fitting manner and connected to the support structure. Alternatively or additionally, it is equally possible for the structural segment to be fixed in place or fastened to the support structure at the intermediate region in a material-bonded manner. A material-bonded connection is, for example, an adhesive connection, a soldered connection, or a welded connection.

An intermediate region in the support structure may be a recess, an opening, a hole, or the like. The intermediate region can be produced by casting technology, by forging technology, or in another way. The intermediate region can be produced by machining, for example by means of milling or drilling.

In some exemplary embodiments in accordance with the invention, the essentially planar surface of the radially outwardly arranged surface of the support structure and of the structural segment is an essentially flat surface. A planar surface or a flat surface may be referred to as a smooth surface. An essentially planar surface can be a surface that has surface unevenness, edges, or shoulders on the surface. An essentially planar surface can be a surface on which a flow that passes parallel along the surface is disrupted only slightly. An essentially planar surface can advantageously prevent or at least reduce local flow separations, flow-stalling edges, vortices, or other effects of the flows. This can lead to lower flow losses, a reduced temperature increase in the flow, and an improved efficiency compared to surfaces that are not planar or essentially not planar.

In some embodiments in accordance with the invention, the radially outwardly directed surface of the rotor blade shroud is smooth, free of contours, unstructured, free of depressions and elevations, and/or closed, outside of the one sealing tip or plurality of sealing tips, including the essentially planar surface mentioned. In this way, it is possible to prevent or at least to reduce any vortexing and any therewith entailed loss of efficiency in an especially advantageous manner.

In some embodiments in accordance with the invention, the support structure and the structural segment comprise the same material and, in particular, are formed integrally with each other; for example, they are jointly formed in an integral additive manner. This permits an especially stable construction, in particular, in terms of high centrifugal force loads.

In some exemplary embodiments in accordance with the invention, the support structure is produced from a first material or comprises a first material and the structural segment is produced from a second material or comprises a second material. The first material and the second material can be the same or different. For example, the support structure can be produced from a metallic material and the structural element can be produced from the same material, from a similar material, or from a different material. A metallic material can be, solely by way of example, a nickel-based alloy and/or a titanium alloy.

In some exemplary embodiments in accordance with the invention, the support structure has at least two intermediate regions in which at least two structural segments are arranged. The support structures can be arranged in such a way that the structural segments do not abut one another and hence the structural segments are spatially separated from one another by the support structures. In this way, it is possible advantageously to achieve a high stability in terms of, for example, a high torsional stiffness of the support structure after the structural segments have been introduced into the intermediate regions. The stability of the shroud can be increased after the structural segments have been introduced into the intermediate regions.

In some exemplary embodiments in accordance with the invention, the sealing tip or the support structure is solid in form. It is equally possible for the sealing tips and the support structure to be solid in form. A solid construction may mean, in particular, that there are no hollow structures in the structural components. In this connection, hollow structures are understood to mean hollow structures that are open and/or closed toward the outside (with respect to the solid structural component). Closed hollow structures can be enclosed cavities, bubbles, hollow spaces, etc. in the structural component. Open hollow structures can be bores made in the structural component from the outside. Closed and/or open hollow structures can fundamentally be utilized to reduce the weight of a structural component.

In some exemplary embodiments in accordance with the invention, the shroud comprises at least two sealing tips, with the support structure being arranged between the sealing tips. The sealing tips can be arranged essentially parallel to one another. The sealing tips can extend over the entire periphery in their longitudinal alignment and hence can extend over all rotor blades of a rotor stage or a rotating wheel.

In some exemplary embodiments in accordance with the invention, the support structure is rib-shaped in form. A rib-shaped support structure can be lattice-shaped or grid-shaped. The intermediate spaces of the rib-shaped support structure may be referred to as intermediate regions.

In some exemplary embodiments in accordance with the invention, at least one structure segment has a hollow structure. Hollow structures of the structural segment are understood to mean open and/or closed hollow structures (with respect to the structural segment). Closed hollow structures can be enclosed cavities, bubbles, hollow spaces, etc. in the structural segment. The outwardly closed hollow structures can be individually closed inside of the structural segment or can be connected to other hollow structures. This may be referred to as a partially or completely inner hollow structure. The particular design of an inner hollow structure can depend on, among other things, the manufacturing method of the structural segment. The hollow structures can advantageously reduce the weight of the structural segment in comparison to a solid structural segment.

Accordingly, the structural segment or all structural segments can have a lower density than the support structure.

In some exemplary embodiments in accordance with the invention, the sealing tips have a width that is constant over the periphery and that is aligned perpendicularly to the peripheral direction. The peripheral direction refers to the direction of rotation of the rotor blade. A constant width over the periphery can be advantageous for optimizing the sealing effect of a gap between the sealing tip of the shroud and a run-in seal of the housing or to minimize any leakage flow between the sealing tip and the run-in seal.

In some exemplary embodiments in accordance with the invention, a second sealing tip is arranged downstream of a first sealing tip and is radially displaced outward with respect to the first sealing tip. This purely exemplary arrangement of the sealing tips of a shroud can be chosen, in particular, for rotating blades that can be used in low-pressure turbines of aircraft engines.

In some exemplary embodiments in accordance with the invention, the first sealing tip and the second sealing tip are arranged essentially parallel to each other in their longitudinal alignment.

In some exemplary embodiments in accordance with the invention, the surface of the support structures and of the further structural regions that are arranged radially outward forms an essentially planar surface over the entire periphery.

Many or all of the embodiments in accordance with the invention can have one, a plurality of, or all of the advantages mentioned above and/or in the following.

By means of the rotor blade shroud according to the invention, it is advantageously possible to increase the efficiency of the turbomachine. Without the rotor blade shroud according to the invention, it is possible for a permanent momentum exchange to take place between the shroud and a housing-side run-in seal. This permanent momentum exchange can bring about an increased friction in the flow. The flow between the shroud and the run-in seal may be called a leakage flow or can be or form a part of a leakage flow. This momentum exchange can be caused, in particular, by edges of the stiffening ribs of the shroud, which can lead to local flow separations, vortices, and local turbulences. These flow phenomena can slow down the rotor. Furthermore, these flow phenomena can lead to a so-called blending of the flow, which increases the entropy of the leakage flow and thereby degrades the efficiency or increases the losses in efficiency. By means of the rotor blade shroud according to the invention, which forms an outwardly essentially planar surface of the support structure and of the structural segment, these flow phenomena can at least be reduced in that the flow is less disrupted along this essentially planar surface. The flow separations, vortices, and local turbulences can at least be reduced in this way. The essentially planar surface can be, in particular, a smooth, peripherally symmetric surface contour. Therefore, by means of the rotor blade shroud, the losses in efficiency in the flow and, in particular, in the leakage flow, can be reduced. In particular, at high peripheral speeds of the shroud, that is, at high rotational speeds and/or for large outer diameters, the mentioned flow phenomena can manifest relevant effects in terms of the efficiency.

Furthermore, by means of the rotor blade shroud according to the invention, it is possible to advantageously reduce potential increases in temperature in the leakage flow that arise due to the above-mentioned flow phenomena. Elevated temperatures in the leakage flow can have a detrimental effect on adjoining structural components, such as, for example, structural components of the housing, in particular in the case of narrow radial gaps between the rotor and the adjoining housing.

Elevated temperatures can lead, for example, to deformations of adjoining structural components, which, in particular, in the case of fast-running turbines, can lead to damage to structural components.

By means of the rotor blade shroud according to the invention, it is possible advantageously at least to reduce or suppress any flow-loss-increasing effect of a so-called "pumping" of the fluid in the leakage flow into the run-in seal, which, solely by way of example, can have a so-called honeycomb structure. It is equally possible for the momentum exchange of the flow, which is associated with this "pumping," to at least be reduced. The "pumping" of a flow into the run-in seal can occur or arise in a periodic manner.

BRIEF DESCRIPTION OF THE DRAWING FIGURES

The present invention will be explained by way of example in the following on the basis of the appended drawings, in which identical reference numbers refer to identical or similar structural components. In each of the following figures that are very schematically simplified:

DESCRIPTION OF THE INVENTION

Figure 1:
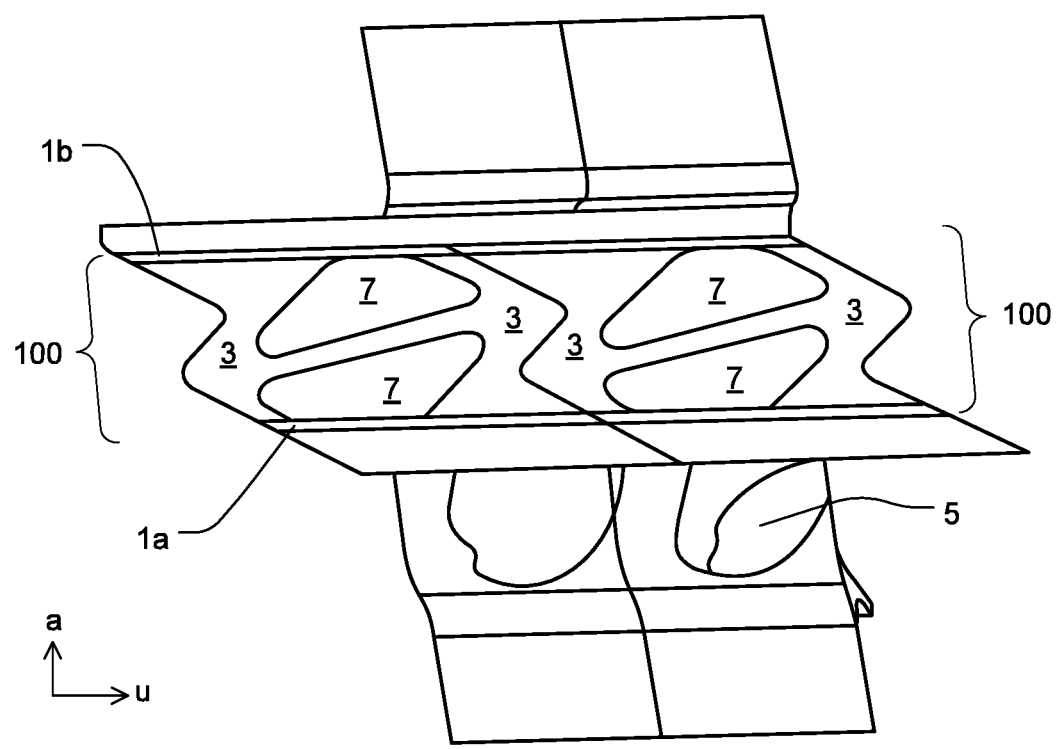
FIG. 1 shows, in a top view from radially outside, a rotor blade shroud that has two sealing tips and a support structure and rotor blade elements arranged below it in accordance with the prior art.

FIG. 1 shows, in a top view from radially outside, a rotor blade shroud 100 with two sealing tips 1a, 1b and a support structure 3 and with rotor blades 5 arranged below it in accordance with the prior art.

The rotor blade shroud 100 (which is referred to in the following as the shroud 100) has two sections, which are arranged in succession in the peripheral direction u and may be referred to as rotor blade shroud sections. Assigned to each section is a rotor blade body 5 arranged below it. The shroud 100 can be fabricated separately or in one piece with the rotor blade body 5.

The shroud 100 has intermediate regions 7, which are surrounded or enclosed by the support structure 3. The webs of the support structure 3 may be referred to as stiffening ribs. The arrangement, the choice of material, and the thickness of the stiffening ribs are intended to make possible a stiffness of the shroud 100 that is as high as possible with, at the same time, a minimization of weight.

The illustrated arrangement of the two segments of the shroud 100 and of the rotor blade bodies 5 continues further in the peripheral direction u, so that a closed rotating wheel or rotor of a rotor stage can be formed.

Figure 2:
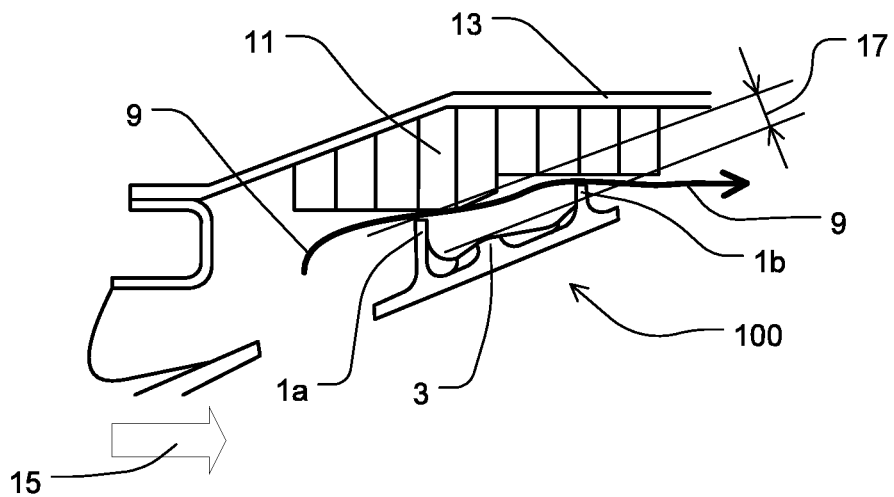
FIG. 2 shows the course of a leakage flow between a rotor blade shroud that has two sealing tips, a support structure, and a housing-side run-in seal in accordance with the prior art.

FIG. 2 shows the course of a leakage flow 9 between a shroud 100 that has two sealing tips 1a, 1b, 1a, a support structure 3, and a housing-side run-in seal 11 in accordance with the prior art.

The run-in seal 11 is fastened to a housing 13. The run-in seal 11 can be honeycomb-shaped in form. The leakage flow 9 flows from upstream with respect to the main through-flow direction 15 to downstream between the sealing tips 1a, 1b and through the run-in seal 11. The leakage flow 9 may be referred to as a gap flow. The gap can be formed in that, when the rotor or the turbomachine is started up, the sealing tips 1a, 1b cut into the run-in seal 11 and form a sealing gap. For an efficiency of the turbomachine that is as high as possible, the flow losses due to the leakage flow 9 should be minimized. This can be achieved, in particular, by a small gap width, but also by flow losses of the leakage flow 9 that are as small as possible and can be caused, for example, by flow separations, turbulences, and other flow phenomena (see FIG. 3).

Furthermore, the distance 17 between the top edge of the support structure 3 and the run-in seal 11 is specified. This distance 17 is relevant in regard to a flow that passes in the peripheral direction u above the support structure 3 and between the sealing tips 1a, 1b. This flow is influenced by the surface structure of the shroud 100 between the sealing tips 1a, 1b.

Figure 3:
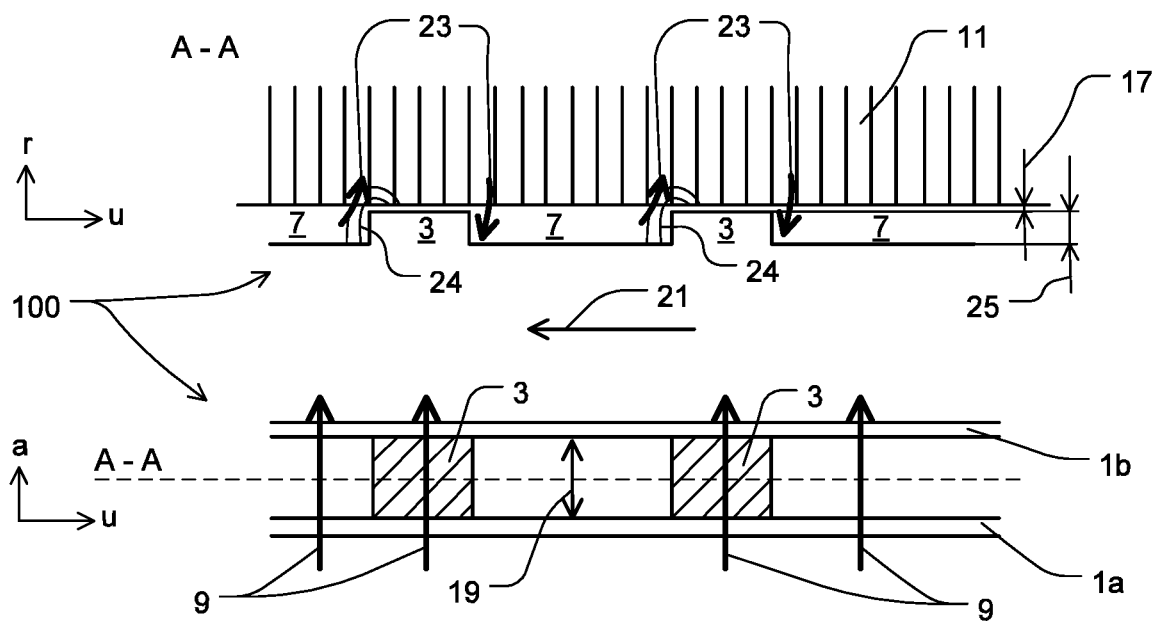
FIG. 3 shows a simplified illustration of the loss mechanism at a rotor blade shroud in a sectional illustration and in a view from the top in accordance with the prior art.

FIG. 3 shows a simplified illustration of the loss mechanism at a rotor blade shroud 100 in a sectional illustration and in a view from the top in accordance with the prior art.

The lower view in FIG. 3 is a schematically greatly simplified top view of the shroud 100, similar to the illustration of FIG. 1, but without illustration of the rotor blade and without any further details. The leakage flow 9 passes in the direction shown by the arrows over and away from the sealing tips 1a, 1b (alternatively in a direction rotated by 180 degrees). The support structure 3 is likewise illustrated in a greatly simplified manner, without illustration of the individual webs of the support structure 3 in detail. In addition, the inner width 19 of the shroud 100 is indicated in the axial direction a (through-flow direction of the turbomachine), whereby the inner width 19 does not include the width of the two sealing tips 1a, 1b (for which reason, the width is referred to as the inner width 19).

The line of section A-A in the lower view in FIG. 3 marks the illustrated sectional plane of the top view in FIG. 3. The direction of rotation 21 of the shroud 100 in the peripheral direction u applies to both views, upper and lower, in FIG. 3. The direction of rotation 21 can be described in detail by the formula $c_u = \omega \cdot r$, where $c_u$ is the peripheral speed of the rotor, $\omega$ (omega) is the angular velocity, and r is the radius of the shroud 100, all with reference to the axis of rotation of the rotor.

In the upper view in FIG. 3, the momentum exchange between the shroud 100 and the run-in seal 11 by means of the flow into the run-in seal 11 and out of the run-in seal 11 is illustrated by the flow arrows 23 in a schematically simplified manner. The lines 24 indicate the backed-up flow at the support structure 3 or at the stiffening ribs of the support structure 3. The shroud 100 moves in the direction of the peripheral speed $c_u$ of the rotor or to the left with reference to the illustration in FIG. 3. On account of the support structure 3 and the intermediate regions 7, the flow backs up or accumulates in front of the stiffening ribs of the support structure 3. The flow pressure accordingly increases (up to the back pressure) and the flow deflects and branches into the run-in seal 11 in accordance with the illustrated flow arrows 23. This deflection of the flow into the run-in seal 11 may be referred to as a so-called "pumping." In the run-in seal 11, the flow pressure likewise increases on account of the usually honeycomb-shaped structure in the run-in seal 11. When the shroud 100 rotates further in the direction of the peripheral speed $c_u$ of the rotor, the fluid that has previously flowed into the run-in seal 11 will flow back subsequently into the intermediate region 7 once again in the direction of the shroud 100 and afterwards will be strongly accelerated up to the peripheral speed $c_u$. These permanent and repeating flows can be enhanced still further by turbulences, flow stalls, and other flow phenomena.

The flows 23 into the run-in seal 11 and out of the run-in seal 11 may be referred to as a momentum exchange of the flow. This permanent momentum exchange can cause an increased friction in the flow and slow down the rotor. Furthermore, these flow phenomena can lead to a so-called blending of the flow, which increases the entropy of the leakage flow and thereby degrades the efficiency or increases the efficiency losses.

Further specified in FIG. 3 are the height 25 of the ribs of the support structure 3 and the distance 17 between the stiffening ribs of the support structure 3 and the run-in seal 11.

Figure 4:
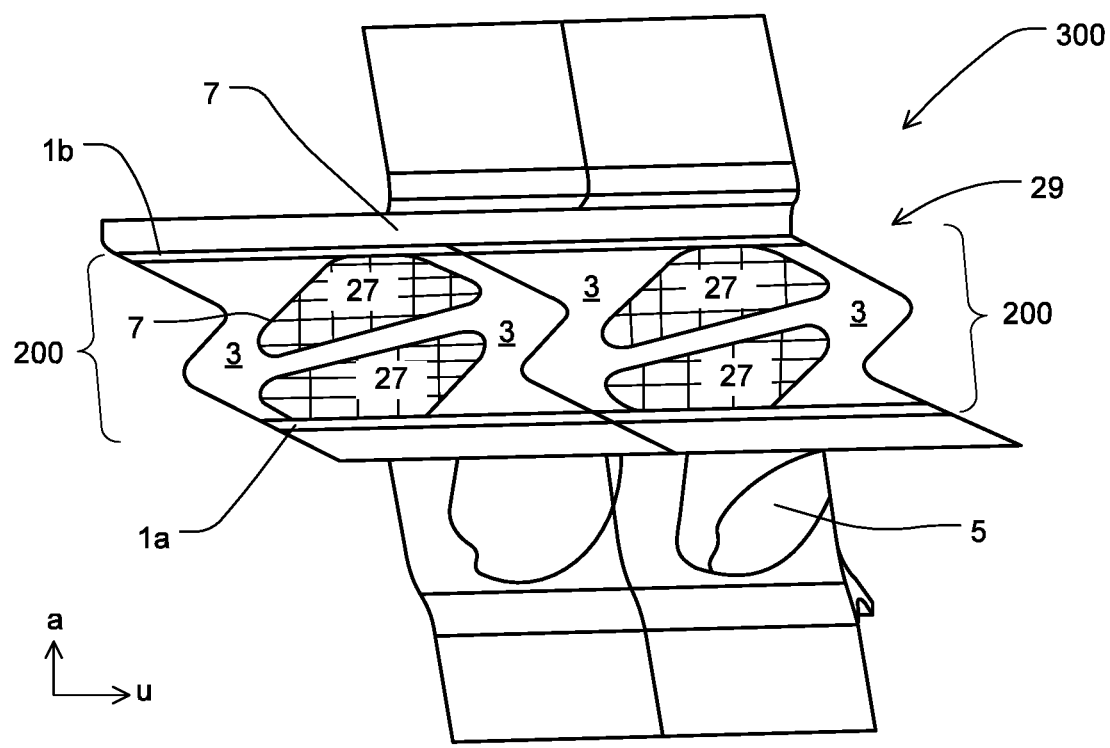
FIG. 4 shows, in a top view from radially outside, a rotor blade shroud according to the invention, which has two sealing tips, a support structure, and rotor blade elements arranged below it.

FIG. 4 shows, in a top view from radially outside, a rotor blade shroud 200 according to the invention that has two sealing tips 1a, 1b and a support structure 3 and a rotor blade element 5 arranged below it.

The rotor blade shroud 200 according to the invention (which is referred to in the following as the shroud 200) has, in addition to the description of the shroud 100 in accordance with the prior art (see FIG. 1), the structural segments 27, which are inserted into the intermediate regions 7.

Figure 5:
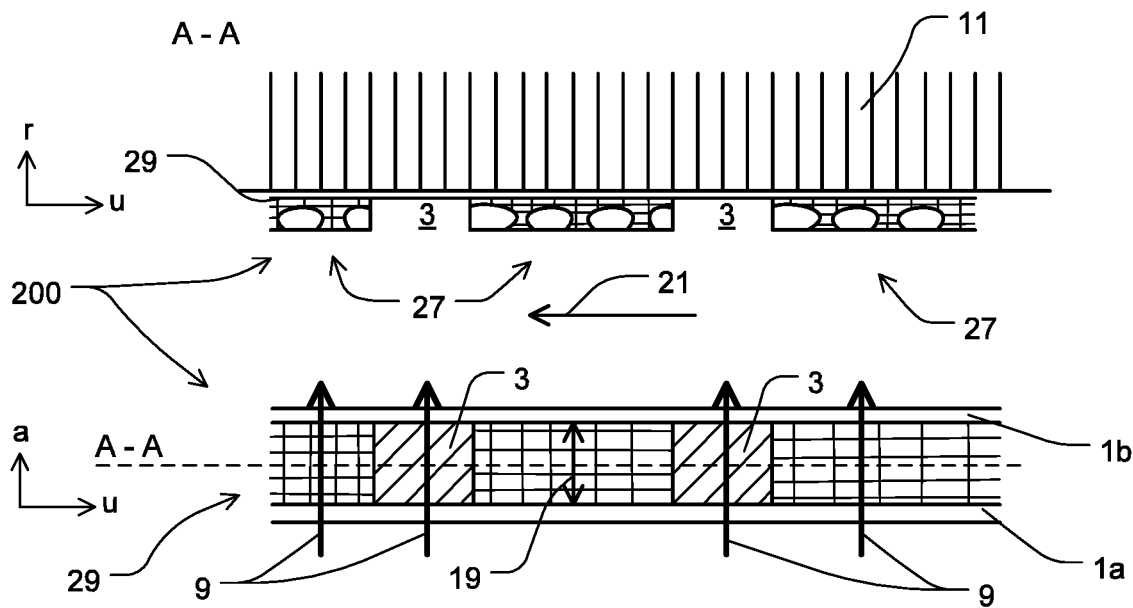
FIG. 5 shows a simplified illustration of the rotor blade shroud according to the invention in a sectional illustration and in a view from the top.

The radially outwardly arranged surface 29 of the support structure 3 and of the structural segments 27 forms an essentially planar surface 29 (see FIG. 5).

FIG. 5 shows a simplified illustration of the rotor blade shroud 200 according to the invention in a sectional illustration and in a view from the top.

In comparison to the illustration of FIG. 3, the structural segments 27 have been inserted into the intermediate regions 7. As a result, the flow phenomena described in regard to FIG. 3, such as, for example, the so-called pumping of the flow into the run-in seals 11 and out of the run-in seals 11, do not arise. In this way, it is possible to increase the efficiency of the rotor, as already described above in detail, in comparison to the design in accordance with prior art.

The structural segments 27 optionally have inner hollow structures, which can contribute to the reduction in weight of the shroud 200.

Further illustrated in FIG. 5 is the radially outwardly arranged surface 29 of the support structure 3.

What is claimed is:

1. A rotor blade shroud for a turbomachine, comprising:
one sealing tip or a plurality of sealing tips and a support structure that abuts the one or plurality of sealing tips,
wherein the support structure has at least one intermediate region in which a structural segment is arranged,
wherein the radially outwardly arranged surface of the support structure and of the structural segment forms a closed hollow structure, and
wherein the at least one intermediate region forms a recess that receives the structural segment.

2. The rotor blade shroud according to claim 1, wherein the support structure and the structural segment comprise the same material, and are formed integrally with each other, being jointly formed in an integrally additive manner.

3. The rotor blade shroud according to claim 1, wherein the support structure is produced from a first material or comprises a first material, and wherein the structural segment is produced from a second material or comprises a second material, wherein the first material and the second material are different.

4. The rotor blade shroud according to claim 1, wherein the support structure has at least two intermediate regions in which two structural segments are arranged.

5. The rotor blade shroud according to claim 1, wherein the one sealing tip or a plurality of sealing tips and/or the support structure is solid in form.

6. The rotor blade shroud according to claim 1, wherein the support structure is arranged between the plurality of sealing tips.

7. The rotor blade shroud according to claim 1, wherein the support structure is rib-shaped in form.

8. The rotor blade shroud according to claim 1, wherein the at least one structural segment has a hollow structure and/or has a lower density than the support structure.

9. The rotor blade shroud according to claim 1, wherein the one sealing tip or a plurality of sealing tips have a width over the periphery that is constant and is aligned perpendicularly to the peripheral direction and/or
wherein a second sealing tip is arranged downstream of a first sealing tip, and the second sealing tip is radially displaced outward with respect to the first sealing tip, wherein the first sealing tip and the second sealing tip are arranged essentially parallel to each other in their longitudinal alignment.

10. The rotor blade shroud according to claim 1,
wherein the at least one sealing tip is a first sealing tip and a second sealing tip, and
wherein the radially outwardly arranged surface of the support structures and of the further structural segments, and/or the surface of the rotor blade shroud that is arranged radially outward between the first sealing tip and the second sealing tip forms a substantially planar surface over an entire periphery thereof.

11. The rotor blade shroud according to claim 1, wherein the rotor blade shroud is configured and arranged in a rotor blade.

12. The rotor blade shroud according to claim 1, wherein the rotor blade shroud is formed by additive manufacturing in one manufacturing step.

13. The rotor blade shroud according to claim 1, including a rotor blade for a turbomachine formed additive manufacturing in one manufacturing step, wherein the rotor blade comprises the rotor blade shroud.

14. A method of manufacturing a rotor blade shroud for a turbomachine, comprising the steps of:
providing a rotor blade shroud, comprising at least two sealing tips and a support structure that abuts the at least two sealing tips, wherein the support structure has at least one intermediate region, wherein the intermediate region is a recess;
forming, by an additive manufacturing method, of at least one structural segment, and all structural segments, which is or are each arranged in an intermediate region of the support structure, so that, in the case of the manufactured rotor blade shroud, a radially outwardly arranged surface of the support structure and of the structural segments forms a substantially planar surface,
wherein the rotor blade shroud forms a closed hollow structure.

* * * * *